US012664076B2

(12) United States Patent
Fan et al.

(10) Patent No.: US 12,664,076 B2
(45) Date of Patent: Jun. 23, 2026

(54) TEST COVERAGE OPTIMIZING MECHANISM BASED ON METRIC EVALUATION SYSTEM

(71) Applicant: Dell Products L.P., Round Rock, TX (US)

(72) Inventors: Huijuan Fan, Chengdu (CN); Bob Biao Yan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 161 days.

(21) Appl. No.: 18/093,873

(22) Filed: Jan. 6, 2023

(65) Prior Publication Data

US 2023/0222054 A1 Jul. 13, 2023

(30) Foreign Application Priority Data

Jan. 11, 2022 (CN) .......................... 202210027845.4

(51) Int. Cl.
*G06F 11/3668* (2025.01)

(52) U.S. Cl.
CPC ...... *G06F 11/3692* (2013.01); *G06F 11/3684* (2013.01)

(58) Field of Classification Search
CPC ............. G06F 11/3692; G06F 11/3684; G06F 11/3676; G06F 11/3688
USPC ........................................................ 717/124
See application file for complete search history.

(56) References Cited

U.S. PATENT DOCUMENTS

| | | | | | |
|---|---|---|---|---|---|
| 8,495,575 B2* | 7/2013 | Rau | ..................... | G06F 11/3676 | |
| | | | | 717/124 | |
| 8,527,813 B2* | 9/2013 | Budnik | ............... | G06F 11/3688 | |
| | | | | 714/33 | |
| 8,589,859 B2* | 11/2013 | Kaulgud | ............. | G06F 11/3616 | |
| | | | | 717/102 | |
| 8,719,789 B2* | 5/2014 | Adler | .................. | G06F 11/3676 | |
| | | | | 717/124 | |
| 8,719,799 B2* | 5/2014 | Adler | .................. | G06F 11/3676 | |
| | | | | 717/124 | |
| 10,768,893 B2* | 9/2020 | Misra | .................. | G06F 11/3676 | |
| 11,204,858 B1* | 12/2021 | Barash | ...................... | G06F 8/71 | |
| 11,847,447 B2* | 12/2023 | Shufer | ................ | G06F 11/3692 | |
| 2005/0081104 A1* | 4/2005 | Nikolik | ............... | G06F 11/3676 | |
| | | | | 714/E11.207 | |
| 2009/0265681 A1* | 10/2009 | Beto | .................... | G06F 11/3688 | |
| | | | | 717/100 | |

(Continued)

OTHER PUBLICATIONS

Al-Ahmad, Bilal. "Using Code Coverage Metrics for Improving Software Defect Prediction." J. Softw. 13.12 (2018): 654-674. (Year: 2018).*

*Primary Examiner* — Matthew J Brophy

(74) *Attorney, Agent, or Firm* — Krishnendu Gupta; Lesley Leonessa

(57) ABSTRACT

Methods, system, and non-transitory processor-readable storage medium for test coverage optimizing system are provided herein. An example method includes executing at least one test case on a system. A weighted average baseline metrics calculation module calculates a weighted average baseline metric for at least one test case using test related failures that occurred during the execution. A coverage imbalance module calculates a coverage imbalance associated with a test domain using the weighted average baseline metric, where the test domain comprises the at least one test case.

20 Claims, 6 Drawing Sheets

(56) References Cited

U.S. PATENT DOCUMENTS

| | | | | |
|---|---|---|---|---|
| 2010/0287534 A1* | 11/2010 | Vangala | G06F 11/3612 | |
| | | | | 717/124 |
| 2011/0055799 A1* | 3/2011 | Kaulgud | G06F 11/3616 | |
| | | | | 717/101 |
| 2011/0138358 A1* | 6/2011 | Rau | G06F 11/3676 | |
| | | | | 717/124 |
| 2011/0246834 A1* | 10/2011 | Rajashekara | G06F 11/3676 | |
| | | | | 714/E11.208 |
| 2012/0233596 A1* | 9/2012 | Adler | G06F 11/3676 | |
| | | | | 717/124 |
| 2012/0233614 A1* | 9/2012 | Adler | G06F 11/3676 | |
| | | | | 718/100 |
| 2013/0067298 A1* | 3/2013 | Li | G06F 11/302 | |
| | | | | 714/799 |
| 2013/0159774 A1* | 6/2013 | Budnik | G06F 11/3688 | |
| | | | | 714/33 |
| 2013/0219373 A1* | 8/2013 | Guan | G06F 9/4484 | |
| | | | | 717/130 |
| 2016/0055079 A1* | 2/2016 | Hanna | G06F 11/3684 | |
| | | | | 717/135 |
| 2019/0155572 A1* | 5/2019 | Misra | G06F 11/263 | |
| 2020/0379886 A1* | 12/2020 | Potter | G06F 11/3676 | |
| 2021/0073109 A1* | 3/2021 | Naylor-Teece | G06F 11/3476 | |
| 2021/0286704 A1* | 9/2021 | Hicks | G06F 11/3612 | |
| 2022/0261340 A1* | 8/2022 | Hicks | G06F 11/3684 | |
| 2022/0342663 A1* | 10/2022 | Barkaee | G06F 8/71 | |
| 2023/0004383 A1* | 1/2023 | Shufer | G06F 11/3676 | |

* cited by examiner 102-1

TEST SYSTEM 102-2

TEST SYSTEM

102-N

TEST SYSTEM

• • •

105

TEST COVERAGE OPTIMIZING SYSTEM

104

NETWORK

100

310

COVERAGE IMBALANCE MODULE

325 —

WEIGHTED AVERAGE BASELINE
METRICS CALCULATION MODULE

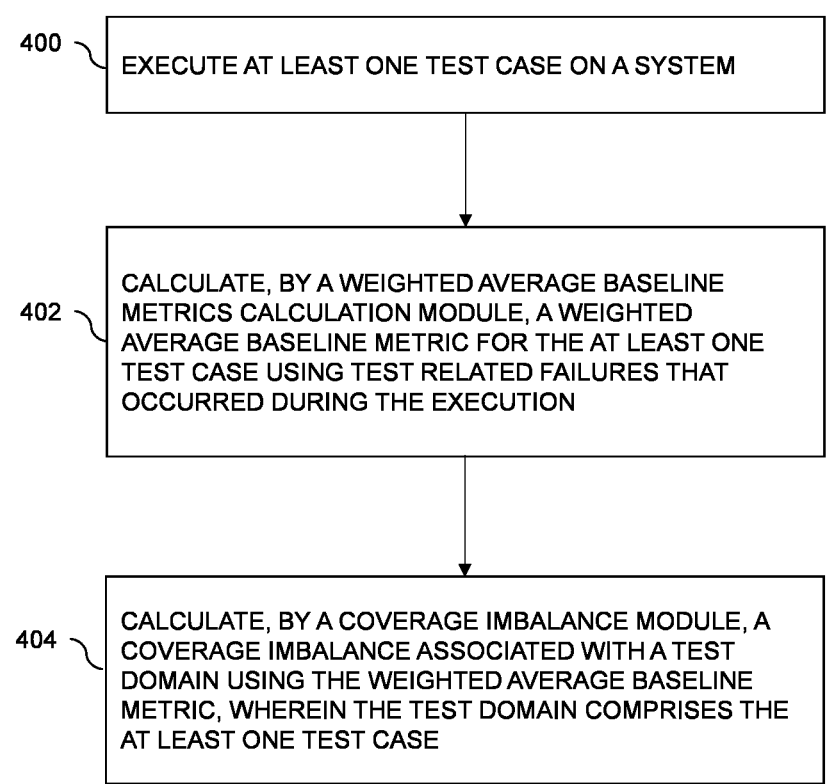

400 — EXECUTE AT LEAST ONE TEST CASE ON A SYSTEM

402 — CALCULATE, BY A WEIGHTED AVERAGE BASELINE METRICS CALCULATION MODULE, A WEIGHTED AVERAGE BASELINE METRIC FOR THE AT LEAST ONE TEST CASE USING TEST RELATED FAILURES THAT OCCURRED DURING THE EXECUTION

404 — CALCULATE, BY A COVERAGE IMBALANCE MODULE, A COVERAGE IMBALANCE ASSOCIATED WITH A TEST DOMAIN USING THE WEIGHTED AVERAGE BASELINE METRIC, WHEREIN THE TEST DOMAIN COMPRISES THE AT LEAST ONE TEST CASE

FIG. 4

TEST COVERAGE OPTIMIZING MECHANISM BASED ON METRIC EVALUATION SYSTEM

FIELD

The field relates generally to optimizing test coverage, and more particularly to optimizing test coverage in information processing systems.

BACKGROUND

Customers demand high quality software, and adequate test coverage is one component of software quality. Measuring the test coverage of software, therefore, is critical to the success of a software project.

SUMMARY

Illustrative embodiments provide techniques for implementing a test coverage optimizing system in a storage system. For example, illustrative embodiments execute at least one test case on a system. A weighted average baseline metrics calculation module calculates a weighted average baseline metric for the test cases using test related failures that occurred during the execution. A coverage imbalance module calculates a coverage imbalance associated with a test domain using the weighted average baseline metric, where the test domain comprises the test cases. Other types of processing devices can be used in other embodiments. These and other illustrative embodiments include, without limitation, apparatus, systems, methods and processor-readable storage media.

BRIEF DESCRIPTION OF THE DRAWINGS

FIG. 4 shows a flow diagram of a process for a test coverage optimizing system in an illustrative embodiment.

DETAILED DESCRIPTION

Figure 1:
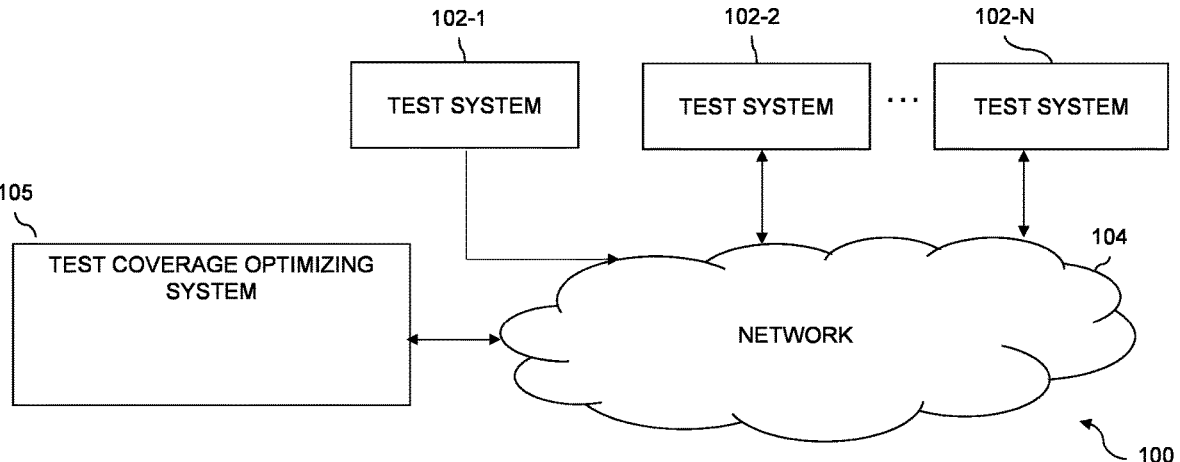
FIG. 1 shows an information processing system including a test coverage optimizing system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a test coverage optimizing system, which technique may be used to provide, among other things, test coverage optimization by executing at least one test case on a system. A weighted average baseline metrics calculation module calculates a weighted average baseline metric for the test cases using test related failures that occurred during the execution. A coverage imbalance module calculates a coverage imbalance associated with a test domain using the weighted average baseline metric, where the test domain comprises the test cases.

The productivity of software development processes is constantly rising as customers demand higher and higher quality. Measuring the test coverage of test software is critical to the success of software projects.

Conventional technologies for optimizing test coverage rely on static review techniques, such as peer reviews, inspections, and code walkthroughs. Conventional technologies that rely on static review techniques are time consuming, subjective and inefficient. For example, a test system running 40 test cases would be difficult to evaluate the test coverage of all the test cases.

By contrast, in at least some implementations in accordance with the current technique as described herein, test coverage is optimized by executing at least one test case on a system. A weighted average baseline metrics calculation module calculates a weighted average baseline metric for the test cases using test related failures that occurred during the execution. A coverage imbalance module calculates a coverage imbalance associated with a test domain using the weighted average baseline metric, where the test domain comprises the test cases.

Thus, a goal of the current technique is to provide a method and a system for providing a test coverage optimizing system that can evaluate the test coverage of test cases running on test systems. Another goal is to provide an efficient, comprehensive, objective system for optimizing test coverage regardless of the types of tests, the purpose of the test, and/or the number of tests running on a test system. Another goal is to identify areas of test coverage imbalance. Yet another goal is to identify test domains and specific test cases within the test domains that need coverage imbalance improvement, and areas within those test cases that need improvement, for example, if test cases are missing key testing points.

In at least some implementations in accordance with the current technique described herein, the use of a test coverage optimizing system can provide one or more of the following advantages: providing an automated, comprehensive assessment and identification of the degree of coverage imbalance of test domains, test cases, and the evaluation metrics within the test cases, and identifying test cases and evaluation metrics that require improvement to achieve the desired coverage imbalance.

In contrast to conventional technologies, in at least some implementations in accordance with the current technique as described herein, test coverage is optimized by executing at least one test case on a system. A weighted average baseline metrics calculation module calculates a weighted average baseline metric for the test cases using test related failures that occurred during the execution. A coverage imbalance module calculates a coverage imbalance associated with a test domain using the weighted average baseline metric, where the test domain comprises the test cases.

In an example embodiment of the current technique, the test coverage optimizing system determines the coverage imbalance associated with the test domain at least meets a coverage imbalance degree threshold.

In an example embodiment of the current technique, the test coverage optimizing system identifies at least one evaluation metric that requires improvement.

In an example embodiment of the current technique, a test improvement module identifies at least one test case in the test domain that requires improvement.

In an example embodiment of the current technique, a test domain classification module classifies the test domain according to the coverage imbalance associated with the test domain and the test related failures that occurred during the execution.

In an example embodiment of the current technique, the test coverage optimizing system determines a validity associated with the test domain based on at least one of the coverage imbalance and a number of test related failures that occurred during the execution as compared to a minimum average bug count per test case.

In an example embodiment of the current technique, the test coverage optimizing system determines an evaluation metric associated with the test domain that requires improvement based on the classification of the test domain.

In an example embodiment of the current technique, the test coverage optimizing system defines at least one evaluation metric for at least one test case.

In an example embodiment of the current technique, the test coverage optimizing system calculates a coverage imbalance degree for at least one evaluation metric for at least one test case.

In an example embodiment of the current technique, the test coverage optimizing system calculates a coverage imbalance degree for at least one evaluation metric for the test domain.

In an example embodiment of the current technique, at least one evaluation metric comprises at least one of diversity, endurance, performance, availability, and scalability.

In an example embodiment of the current technique, the test coverage optimizing system calculates a weight associated with at least one test case based on a number of the test related failures that occurred during execution.

In an example embodiment of the current technique, the test coverage optimizing system calculates an average baseline for at least one evaluation metric associated with at least one test case.

In an example embodiment of the current technique, the test coverage optimizing system calculates an average baseline for at least one evaluation metric associated with the test domain.

In an example embodiment of the current technique, the test domain comprises testing at least one of a component associated with the system and a feature executing on the system.

FIG. 1 shows a computer network (also referred to herein as an information processing system) 100 configured in accordance with an illustrative embodiment. The computer network 100 comprises test systems 102-N. The test systems 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a test coverage optimizing system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the test systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The test systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the test coverage optimizing system 105 are one or more input-output devices, which illustratively comprise keyboards, displays or other types of input-output devices in any combination. Such input-output devices can be used, for example, to support one or more user interfaces to the test coverage optimizing system 105, as well as to support communication between the test coverage optimizing system 105 and other related systems and devices not explicitly shown. For example, a dashboard may be provided for a user to view a progression of the execution of the test coverage optimizing system 105. One or more input-output devices may also be associated with any of the test systems 102-N.

Additionally, the test coverage optimizing system 105 in the FIG. 1 embodiment is assumed to be implemented using at least one processing device. Each such processing device generally comprises at least one processor and an associated memory, and implements one or more functional modules for controlling certain features of the test coverage optimizing system 105.

More particularly, the test coverage optimizing system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the test coverage optimizing system 105 to communicate over the network 104 with the test systems 102-N and illustratively comprises one or more conventional transceivers.

A test coverage optimizing system 105 may be implemented at least in part in the form of software that is stored in memory and executed by a processor, and may reside in any processing device. The test coverage optimizing system 105 may be a standalone plugin that may be included within a processing device.

It is to be understood that the particular set of elements shown in FIG. 1 for test coverage optimizing system 105 involving the test systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the test coverage optimizing system 105 can be on and/or part of the same processing platform.

An exemplary process of test coverage optimizing system 105 in computer network 100 will be described in more detail with reference to, for example, the flow diagram of FIG. 4.

Figure 2:
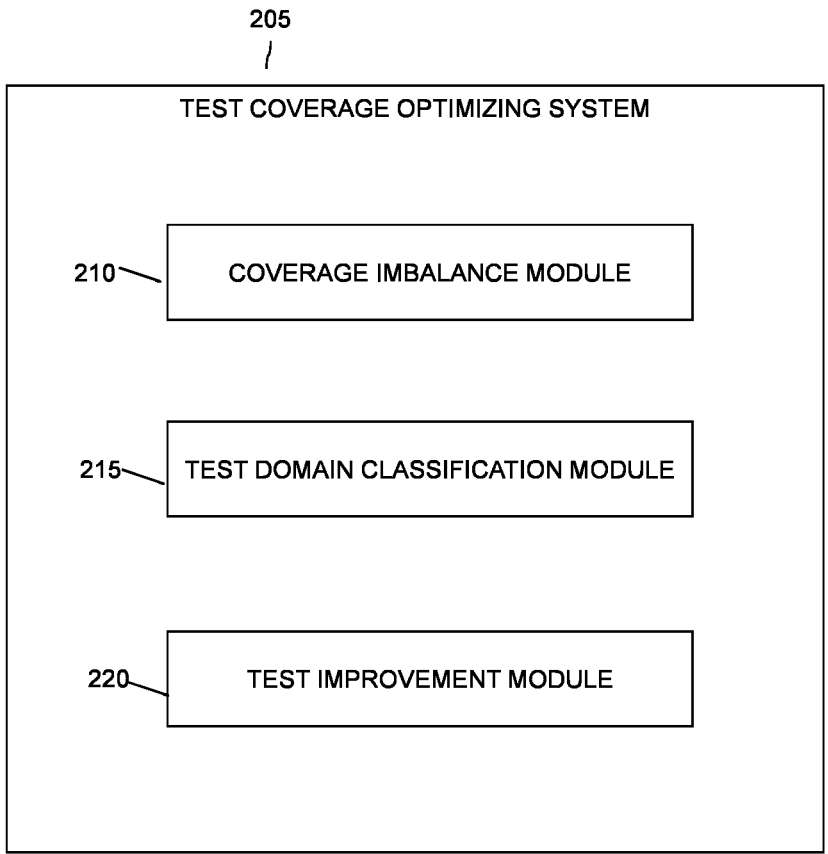
FIG. 2 shows an example of a test coverage optimizing system in an illustrative embodiment.

Referring now to FIG. 2, this figure shows an example of a test coverage optimizing system 105 in an illustrative embodiment.

The test coverage optimizing system comprises a coverage imbalance module 210, a test domain classification module 215, and a test improvement module 220. In an example embodiment, several dimension evaluation metrics are defined to collect and evaluate the test coverage, based on the testing results and experiences. Those dimensions may include diversity, endurance, performance, high availability, and scalability. Diversity represents the number/count of object types, Input/Output (IO) types, etc. Endurance represents the runtime of the test. Performance represents the load status of the test, such as input/output operations per second (IOPS). High availability represents the count/number of errors/faults injected into the test case. Scalability represents the number of created objects. Based on the evaluation metrics, a weighted average baseline metric is calculated using the number of test related bugs/failures that occurred during the execution of the test case(s). The coverage imbalance module 210 uses the weighted average baseline metric to calculate the coverage imbalance degree for the evaluation metrics, and the test domain. The coverage imbalance module 210 will be discussed in greater detail in FIG. 4.

Once the coverage imbalance degree for the evaluation metrics and the test domain have been calculated, the test domain classification module 215 classifies the test domains into different categories according to the coverage balance degree and the bug count of the test domain. For example, test domains may be classified as a good test domain, an invalid test domain or an attention needed test domain.

For those test domains that are classified as an invalid test domain or an attention needed test domain, the test improvement module 220 determines which evaluation metrics in the test domain need to be improved to improve the overall coverage imbalance degree of the test domain. Once those identified evaluation metrics are improved, the coverage imbalance degree of the associated tests is improved, and correspondingly, the coverage imbalance degree of the test domain is improved.

Figure 3:
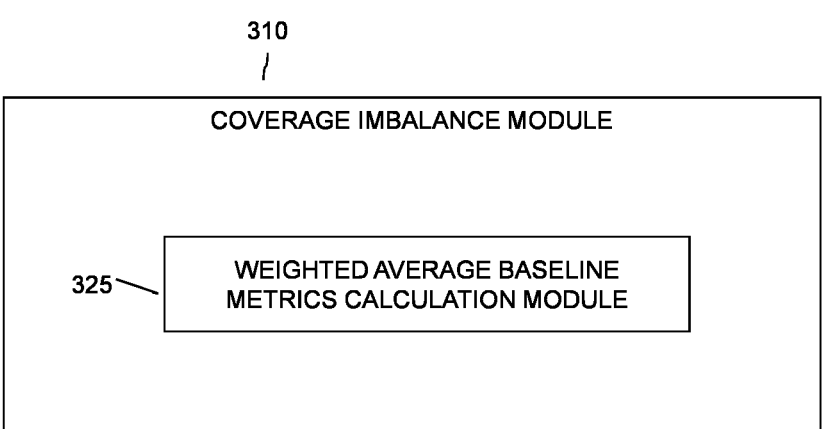
FIG. 3 shows an example of a coverage imbalance module in an illustrative embodiment.

Referring now to FIG. 3, this figure shows an example of a coverage imbalance module 210 in an illustrative embodiment. The coverage imbalance module 210 comprises the weighted average baseline metrics calculation module 325. Based on the evaluation metrics, a weighted average baseline metric is calculated using the number of test related bugs/failures that occurred during the execution of the test case(s). The coverage imbalance module 210 uses the weighted average baseline metric to calculate the coverage imbalance degree for the evaluation metrics, and the test domain, as described below in FIG. 4.

FIG. 4 is a flow diagram of a process for execution of the test coverage optimizing system 205 in an illustrative embodiment. It is to be understood that this particular process is only an example, and additional or alternative processes can be carried out in other embodiments.

At 400, a test case is executed on a test system 102-N. A test case may be executed on several different test systems 102-N, and/or several test cases may be executed on a single test system 102-1.

In an example embodiment, the test coverage optimizing system 205 defines at least one evaluation metric for the test case, such as diversity, endurance, performance, high availability, and scalability. The evaluation metrics are defined to collect and evaluate the test coverage based on the testing results. Diversity represents the number/count of object types, Input/Output (IO) types, etc. Endurance represents the runtime of the test. Performance represents the load status of the test, such as input/output operations per second (IOPS). High availability represents the count/number of errors/faults injected into the test case. Scalability represents the number of created objects.

At 402, the weighted average baseline metrics calculation module 325 calculates a weighted average baseline metric for at least one test case using test related failures that occurred during the execution of the test case. In an example embodiment, the weighted average baseline metrics calculation module 325 calculates an average baseline for at least one evaluation metric associated with the test case. In an example embodiment, a valid test case set T is defined based on history experience, such as a product's releases case design list. Test case set T may be comprised of {test 1, test 2, . . . test i . . . }. Each test i has its own attribute set according to the evaluation metrics and the defects/bugs that occurred during the execution of test i. The attribute set may be defined as $\{D_{test\ i}, E_{test\ i}, P_{test\ i}, HA_{test\ i}, S_{test\ i}, Bug_{test\ i}\}$.

Diversity metric $D_{test\ i}$ is represented by the number of object types, IO types, etc. in the target test. Endurance metric $E_{test\ i}$ is represented by the runtime of the test. Performance metric $P_{test\ i}$ is represented by the load status of the test, for example, IOPS. High availability metric $HA_{test\ i}$ is represented by the number of injected faults. For example, defects may be intentionally introduced into the test system during the execution of the test cases, such as SP reboot, SP panic, power outage, disk pull out, pool offline, etc. The purpose of the injected faults is to test the test systems' high availability during a disaster. Scale metric $S_{test\ i}$ is represented by the number of created objects. In an example embodiment, a test case description will detail what kind of objects are needed and how many objects are needed. For example, objects may be created before the testing, meaning the test case is using an existing object, or objects may be created during the test case execution, at the pre-configuring stage. Bug metric $Bug_{test\ i}$ is represented by the number of test related bugs that occurred during the test execution.

In an example embodiment, the weighted average baseline metrics calculation module 325 calculates an average baseline for at least one evaluation metric associated with the test domain. In other words, the weighted average baseline metrics calculation module 325 calculates the average baseline for each metric. For example, if there are 40 test cases executed in a test domain, and each test case has 5 metrics, then the weighted average baseline metrics calculation module 325 calculates 200 average baseline metrics. In an example embodiment, the test domain comprises testing at least one component associated with the system and/or at least one feature executing on the system. In an example embodiment, the average baseline for each metric may be calculated by:

$$M_{avg} = \sum_{i=1}^{N} \omega_{test_i} \cdot M_{test\ i}$$

The evaluation metrics of $D_{test\ i}$, $E_{test\ i}$, $P_{test\ i}$, $HA_{test\ i}$, $S_{test\ i}$, may be represented by $M_{test\ i}$.

In an example embodiment, the weighted average baseline metrics calculation module 325 calculates a weight associated with at least one test case based on a number of the test related failures that occurred during execution. For example, the average baseline metric is calculated by the weighted average baseline metrics calculation module 325 using a bug count based weighted equation $\omega_{test\ i}$ which represents the weight of test i and where $$\sum_{i=1}^{N} \omega_{test_i} = 1.$$

For example, if a first test, test1, produces one bug when executed, and a second test, test2, produces two bugs when executed, $\omega_{test_1}$ is ⅓, and $\omega_{test_2}$ is ⅔. In an example embodiment, the weight of test i depends on the number of test related bugs. In other words, the more bugs that occur during the execution of test i, the larger the corresponding weight of test i is. The weight of test i may be calculated as follows:

$$\omega_{test_i} = \frac{Bug_{test_i}}{\sum_{i=1}^{N} Bug_{test_i}}$$

In an example embodiment, the coverage imbalance module 210 calculates each metric's coverage imbalance degree for each test i. The metric coverage imbalance degree may be calculated as the following:

$$\lambda_{M,test\ i} = \frac{|M_{test\ i} - M_{avg}|}{M_{avg}}$$

In an example embodiment, the coverage imbalance module 210 calculates a coverage imbalance degree for at least one evaluation metric for at least one test case. For example, the coverage imbalance module 210 calculates the coverage imbalance degree of the evaluation metrics coverage imbalance degree of test i as the following:

$$\lambda_{test\ i} = \frac{1}{x} \cdot \sum_{M \in \{D,E,P,HA,S\}} \lambda_{M,test\ i}$$

In this example, x=the number of evaluation metrics. For example, if there are five evaluation metrics, then 1/x would be ⅕. For example:

$$\lambda_{test\ i} =$$

$$\frac{1}{5} \cdot \sum_{M \in \{D,E,P,HA,S\}} \lambda_{M,test\ i} = \frac{1}{5} \cdot (\lambda_{D,test\ i} + \lambda_{E,test\ i} + \lambda_{P,test\ i} + \lambda_{HS,test\ i} + \lambda_{S,test\ i})$$

At 404, the coverage imbalance module 210 calculates a coverage imbalance degree associated with a test domain using the weighted average baseline metric. The coverage imbalance degree associated with the test domain is a measure of how spread out the test's evaluation metrics are. For example, a low coverage imbalance degree indicates that the evaluation metrics of the test domain tend to be close to the mean (also referred to as the expected value) of the set T. A high coverage imbalance degree indicates that the evaluation metrics of the test domain are spread out over a wider range. In an example embodiment, every test case focuses on one scope. A test domain of, for example, 40 test cases would cover a wider scope, and idealy, the total scope of the goals of the test cases in the test domain.

In an example embodiment, the coverage imbalance module 210 calculates a coverage imbalance degree for at least one evaluation metric for the test domain. For example, the coverage imbalance module 210 calculates each evaluation metric's coverage imbalance degree for the test domain. In an example embodiment, the test domain comprises at least one test case. Each metric's coverage imbalance degree associated with the test domain j may be calculated as follows:

$$\lambda_{M,test\ domain\ j} = \frac{\sqrt{\frac{\sum_{test\ i \in test\ domain\ j} (M_{test\ i} - M_{avg})^2}{L-1}}}{M_{avg}}$$

In the above calculation, L is the number of test cases in the test domain.

In an example embodiment, the coverage imbalance module 210 calculates the coverage imbalance degree of the evaluation metrics coverage imbalance degree of test domain j as the following:

$$\lambda_{test\ domain\ j} = \frac{1}{x} \cdot \sum_{M \in \{D,E,P,HA,S\}} \lambda_{M,test\ domain\ j}$$

In this example, x=the number of evaluation metrics. For example, if there are five evaluation metrics, then 1/x would be ⅕. In an example embodiment, the coverage imbalance degree of the evaluation metrics coverage imbalance degree of test domain is a measure of how spread out the test cases evaluation metrics are. For example, the smaller the imbalance degree of the test domain, the more imbalanced the test domain.

In an example embodiment the test coverage optimizing system 205 determines the coverage imbalance associated with the test domain at least meets a coverage imbalance degree threshold. In an example embodiment, the test domain classification module 215 classifies the test domain according to the coverage imbalance associated with the test domain and the test related failures that occurred during the execution. Based on the coverage imbalance degree of the evaluation metrics and test domain provided by the coverage imbalance module 210, the test domain classification module 215 applies rules to classify the test domains into at least three categories according to different coverage balance degrees and the bug count of the test domain. For example, the test domain classification module 215 may classify the test domain as an invalid test domain, a good test domain or In an example embodiment, the test domain may be coverage imbalanced but at least an adequate number of bugs may have occurred during the execution of the test case(s). This may be determined by $\lambda_{domain}>\Theta$ and $\mu\geq\Phi$. In this example scenario, the test domain may be valid for a feature specific test domain, or invalid for a common test domain. In an example embodiment, a test domain may have test cases that are specially designed to focus on specific features of the test system and/or specific metrics.

In an example embodiment, the test improvement module 220 determines an evaluation metric associated with the test domain that requires improvement based on the classification of the test domain. For example, the evaluation metric may be determined by evaluating the $\lambda_{M,test\ domain\ j}$ value. In another example embodiment, the test improvement module 220 identifies at least one test case in the test domain that requires improvement. Then, the corresponding metric M may be improved by improving those test cases that have a larger coverage imbalance degree according to the $\lambda_{M,test\ i}$ metric.

In this example scenario, the test domain comprises five test cases. The coverage imbalance module 210 calculates the coverage imbalance degree for the test domain as follows:

| Evaluation metrics | test1 | test2 | test3 | test4 | test5 | baseline | $\lambda_{M,test\ domain}$ | $\lambda_{test\ domain}$ |
|---|---|---|---|---|---|---|---|---|
| Diversity | 6 | 3 | 5 | 8 | 10 | 6 | 91.29% | 72.72% |
| Endurance | 8 | 10 | 13 | 8 | 12 | 12 | 50.69% | |
| Performance | 4 | 13 | 15 | 7 | 12 | 10 | 91.10% | |
| High availability | 3 | 4 | 3 | 2 | 2 | 3 | 57.74% | |
| Scalability | 14 | 8 | 11 | 14 | 6 | 10 | 72.80% | | an attention needed test domain. Thus, a test domain that is an invalid test domain or an attention needed test domain at least meets the coverage imbalance degree threshold.

In an example embodiment, the test domain classification module 215 determines a validity associated with the test domain based on at least one of the coverage imbalance and a number of test related failures that occurred during the execution as compared to a minimum average bug count per test case. For example, assuming the acceptable minimum bug count per test is (I), the average bug count per test is μ, and the acceptable coverage balance degree threshold is Θ, test domain classification module 215 classifies the test domain as either an invalid test domain, good test domain, or attention needed test domain.

An invalid test domain means the test domain is coverage imbalanced and has fewer bugs than desired. An invalid test domain can be determined by $\lambda_{domain}>\Theta$ and $\mu<\Phi$. A test domain that falls into this category needs to be comprehensively enhanced and improved.

A good test domain means the test domain is coverage balanced and produced a good number of bugs during the test executions. A good test domain is ideal, and can be determined by $\lambda_{domain}\leq\Theta$ and $\mu\geq\Phi$.

An attention needed test domain means the test domain is either coverage imbalanced or fewer bugs occurred during the execution of the test case(s). The test domain can be further reviewed according to its domain to determine validity. For example, the test domain may be coverage balanced but with fewer than desired bug. This may be determined by $\lambda_{domain}\leq\Theta$ and $\mu<\Phi$. In this example scenario, the test domain may be valid, especially for a regression targeted test domain, or may be invalid for a system test domain.

The coverage imbalance module 210 calculates the imbalance degree $\lambda_{M,test\ i}$ for each test as follows:

| Evaluation metrics | test1 | test2 | test3 | test4 | test5 |
|---|---|---|---|---|---|
| $\lambda_{D,test}$ | 0.00% | 50.00% | 16.67% | 33.33% | 66.67% |
| $\lambda_{E,test}$ | 33.33% | 16.67% | 8.33% | 33.33% | 0.00% |
| $\lambda_{P,test}$ | 60.00% | 30.00% | 50.00% | 30.00% | 20.00% |
| $\lambda_{HA,test}$ | 0.00% | 33.33% | 0.00% | 33.33% | 33.33% |
| $\lambda_{S,test}$ | 40.00% | 20.00% | 10.00% | 40.00% | 40.00% |

The test domain classification module 215 classifies the test domain by its coverage imbalance degree and number of bugs that occurred during the execution of the test cases. For example, if the test domain has $\mu\geq\Phi$ and the acceptable coverage balance degree threshold is Θ=70%, $\lambda_{domain}=72.72\%>\Theta$. From this data, the test domain classification module 215 classifies the test domain in the attention needed category because the test domain has 3 $\lambda_{M,test\ domain}>\Theta$ in the evaluation metrics of "Diversity", "Performance" and "Scalability".

In an example embodiment, user input may be involved to review the test cases for the test domain to determine which evaluation metric need improvement, how to improve the associated test cases, and to what degree the coverage imbalance needs to be improved. For example, the evaluation metrics of "Diversity", "Performance", and "Scalability" are identified as needing improvement. This is based on each evaluation metric's coverage imbalance degree of test i, $\lambda_{M,test\ i}$, calculated by the coverage imbalance module 210, where those evaluation metrics that are, for example, 50% or higher (i.e., test 1's "Performance" evaluation metric, test 2's "Diversity" evaluation metric, and test 5's "Diversity" metric) are identified as needing improvement.

In another example embodiment, test 3's "Performance" evaluation metric is not identified as needing improvement, despite being at 50% because this test case may have been designed such that a 50% "Performance" evaluation metric meets the goal of the test case. Test cases may be designed to focus on specific test system features, or specific evaluation metrics. For example, a file domain test case may focus on file protocol but might not be focused on the number of objects created. Thus, in this example embodiment, the "Diversity" evaluation metric might be low, yet the test case would not be classified as invalid or attention needed because the test case was not designed to have a high "Diversity" evaluation metric. In other words, a test case may be valuable to the overall testing effort if it can test an adequate amount of defects/bugs even if that test case does not cover all the defined evaluation metrics. The test domain, however, must provide a balanced test coverage to ensure the test system is well tested across all the metrics. In an example embodiment, the test coverage optimizing system 205 first evaluates the coverage imbalance of the test domain, and then the coverage imbalance of the test cases to assess the overall test architecture.

In yet another example embodiment, the scalability evaluation metric imbalance coverage degree is $>\Theta$, but none of the test cases need improvement because all the $\lambda_{S,test}$ values are not far away from the baseline. These values, however, may change with different inputs by users.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve assessment of the degree of coverage imbalance for test domains and test cases. These and other embodiments can effectively improve coverage imbalance relative to conventional approaches. For example, embodiments disclosed herein provide an automated, comprehensive assessment and identification of the degree of coverage imbalance of test domains, test cases, and the evaluation metrics within the test cases. Embodiments disclosed herein identify areas of test coverage imbalance and the degree of test coverage imbalance. Embodiments disclosed herein identify test cases and evaluation metrics that require improvement to achieve the desired coverage imbalance. Embodiments disclosed herein provide a system that is easily scaled with regard to evaluation metrics, and test cases associated with test domains.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of the information processing system 100, these platforms may also be used to implement at least portions of other information processing systems in other embodiments.

Figure 5:
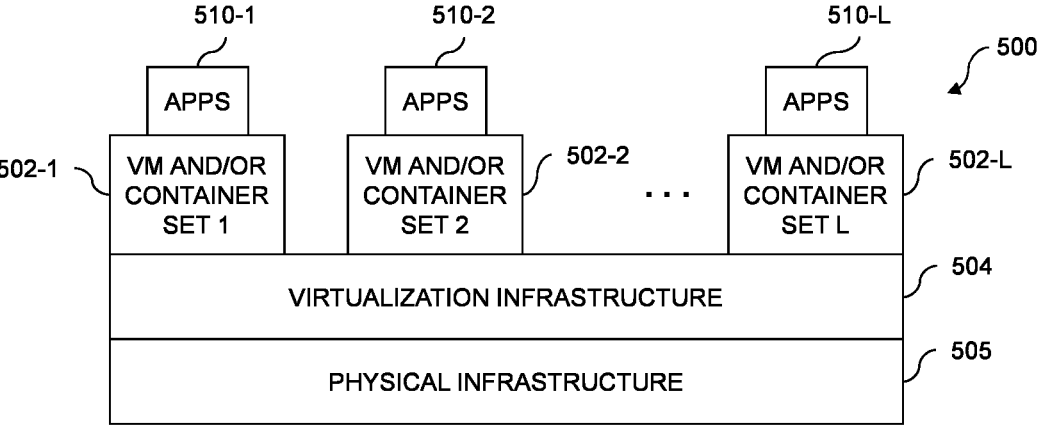
FIGS. 5 and 6 show examples of processing platforms that may be utilized to implement at least a portion of a test coverage optimizing system embodiments.
Figure 6:
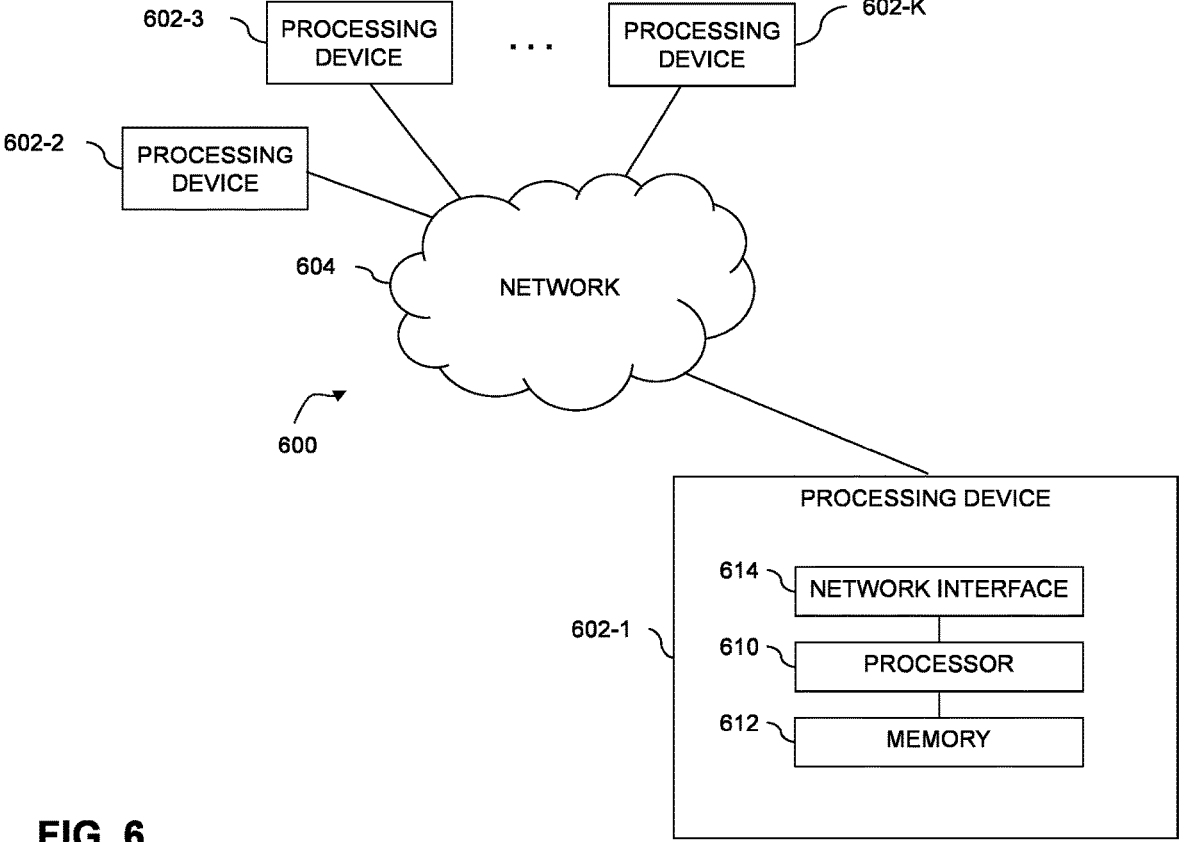

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, where the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of the information processing system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
executing at least one test case on a test system under controlled test conditions;
    automatically collecting test execution data during said execution including test related failures and system performance metrics;
calculating, by a weighted average baseline metrics calculation module implemented in the information processing system, a weighted average baseline metric for the at least one test case using the test related failures that occurred during the execution;
calculating, by a coverage imbalance module implemented in the information processing system, a coverage imbalance associated with a test domain using the weighted average baseline metric, wherein the test domain comprises the at least one test case, wherein the coverage imbalance module calculates each evaluation metric's coverage imbalance degree for the test domain from a plurality of evaluation metrics comprising diversity, endurance, performance, availability, and scalability, wherein the plurality of evaluation metrics are interdependently weighted and evaluated together to determine overall test coverage balance for improving test system reliability, wherein:
diversity represents a count of object types and input/output types tested in the test system;
endurance represents runtime duration of the test case executing on the test system;
performance represents load status measured by input/output operations performed by the test system;
availability represents a count of errors and faults injected into the test system; and
scalability represents a number of objects created in the test system during test execution; and
    automatically generating test system improvement recommendations based on the calculated coverage imbalance, wherein the method is implemented by at least one processing device comprising a processor coupled to a memory and configured to interface with the test system.

2. The method of claim 1 further comprising:
determining the coverage imbalance associated with the test domain at least meets a coverage imbalance threshold.

3. The method of claim 2 wherein determining the coverage imbalance associated with the test domain at least meets the coverage imbalance threshold comprises:
    identifying at least one evaluation metric that requires improvement.

4. The method of claim 2 wherein determining the coverage imbalance associated with the test domain at least meets the coverage imbalance threshold comprises:
    identifying, by a test improvement module, at least one test case in the test domain that requires improvement.

5. The method of claim 2 wherein determining the coverage imbalance associated with the test domain at least meets the coverage imbalance threshold comprises:
    classifying, by a test domain classification module, the test domain according to the coverage imbalance associated with the test domain and the test related failures that occurred during the execution.

6. The method of claim 5 further comprising:
determining a validity associated with the test domain based on at least one of the coverage imbalance and a number of test related failures that occurred during the execution as compared to a minimum average bug count per test case.

7. The method of claim 5 further comprising:
determining an evaluation metric associated with the test domain that requires improvement based on the classification of the test domain.

8. The method of claim 1 further comprising:
defining at least one evaluation metric for at least one test case.

9. The method of claim 8 further comprising:
calculating a coverage imbalance degree for the at least one evaluation metric for the at least one test case.

10. The method of claim 1 wherein the at least one test case comprises
an attribute set according to the plurality of evaluation metrics.

11. The method of claim 1 wherein the coverage imbalance module identifies at least one of a test case and the at least one evaluation metric that requires improvement to achieve a desired coverage imbalance.

12. The method of claim 1 wherein calculating, by the weighted average baseline metrics calculation module, the weighted average baseline metric for the at least one test case comprises:
    calculating a weight associated with the at least one test case based on a number of the test related failures that occurred during execution.

13. The method of claim 1 wherein calculating, by the weighted average baseline metrics calculation module, the weighted average baseline metric for the at least one test case comprises:
    calculating an average baseline for at least one evaluation metric associated with the at least one test case.

14. The method of claim 1 wherein calculating, by the weighted average baseline metrics calculation module, the weighted average baseline metric for the at least one test case comprises:
    calculating an average baseline for at least one evaluation metric associated with the test domain.

15. The method of claim 1 wherein the test domain comprises testing at least one of a component associated with the system and a feature executing on the system.

16. A system comprising:
at least one processing device comprising a processor coupled to a memory;
the at least one processing device being configured:
    to execute at least one test case on a test system under controlled test conditions;
    to automatically collect test execution data during said execution including test related failures and system performance metrics;
    to calculate, by a weighted average baseline metrics calculation module implemented in the information processing system, a weighted average baseline metric for the at least one test case using the test related failures that occurred during the execution;
    to calculate, by a coverage imbalance module implemented in the information processing system, a coverage imbalance associated with a test domain using the weighted average baseline metric, wherein the test domain comprises the at least one test case, wherein the coverage imbalance module calculates each evaluation metric's coverage imbalance degree for the test domain from a plurality of evaluation metrics comprising diversity, endurance, performance, availability, and scalability, wherein the plurality of evaluation metrics are interdependently weighted and evaluated together to determine overall test coverage balance for improving test system reliability, wherein:

diversity represents a count of object types and input/output types tested in the test system;

endurance represents runtime duration of the test case executing on the test system;

performance represents load status measured by input/output operations performed by the test system;

availability represents a count of errors and faults injected into the test system; and scalability represents a number of objects created in the test system during test execution; and automatically generate test system improvement recommendations based on the calculated coverage imbalance.

17. The system of claim 16 further configured:

to define at least one evaluation metric for at least one test case.

18. The system of claim 17 further configured:

to calculate a coverage imbalance degree for the at least one evaluation metric for the at least one test case.

19. The system of claim 17 further configured:

to calculate a coverage imbalance degree for the at least one evaluation metric for the test domain.

20. A computer program product comprising a non-transitory processor-readable storage medium having stored therein program code of one or more software programs, wherein the program code when executed by at least one processing device causes said at least one processing device:

to execute at least one test case on a test system under controlled test conditions;

to automatically collect test execution data during said execution including test related failures and system performance metrics;

to calculate, by a weighted average baseline metrics calculation module implemented in the information processing system, a weighted average baseline metric for the at least one test case using the test related failures that occurred during the execution;

to calculate, by a coverage imbalance module implemented in the information processing system, a coverage imbalance associated with a test domain using the weighted average baseline metric, wherein the test domain comprises the at least one test case, wherein the coverage imbalance module calculates each evaluation metric's coverage imbalance degree for the test domain from a plurality of evaluation metrics comprising diversity, endurance, performance, availability, and scalability, wherein the plurality of evaluation metrics are interdependently weighted and evaluated together to determine overall test coverage balance for improving test system reliability, wherein:

diversity represents a count of object types and input/output types tested in the test system;

endurance represents runtime duration of the test case executing on the test system;

performance represents load status measured by input/output operations performed by the test system;

availability represents a count of errors and faults injected into the test system; and scalability represents a number of objects created in the test system during test execution; and automatically generate test system improvement recommendations based on the calculated coverage imbalance.

* * * * *